US008982079B2

(12) United States Patent
Liao et al.

(10) Patent No.: US 8,982,079 B2
(45) Date of Patent: Mar. 17, 2015

(54) ELECTRONIC DEVICES AND COMMAND INPUT METHODS THEREOF

(71) Applicant: Wistron Corp., New Taipei (TW)

(72) Inventors: Chih-Pin Liao, New Taipei (TW); Shou-Te Wei, New Taipei (TW); Pin-Hong Liou, New Taipei (TW); Che-You Kuo, New Taipei (TW)

(73) Assignee: Wistron Corp., New Taipei (TW)

( * ) Notice: Subject to any disclaimer, the term of this patent is extended or adjusted under 35 U.S.C. 154(b) by 157 days.

(21) Appl. No.: 13/763,580

(22) Filed: Feb. 8, 2013

(65) Prior Publication Data

US 2013/0321298 A1 Dec. 5, 2013

(30) Foreign Application Priority Data

May 30, 2012 (TW) .............................. 101119267 A

(51) Int. Cl.
*G06F 3/041* (2006.01)
*G06F 1/16* (2006.01)
*G06F 3/01* (2006.01)
*G06F 3/0488* (2013.01)

(52) U.S. Cl.
CPC ............ *G06F 3/0412* (2013.01); *G06F 1/1626* (2013.01); *G06F 1/1684* (2013.01); *G06F 1/1694* (2013.01); *G06F 3/017* (2013.01); *G06F 2200/1636* (2013.01); *G06F 3/04883* (2013.01)
USPC ....................................................... 345/173

(58) Field of Classification Search
CPC ..... G06F 3/0416; G06F 3/043; G06F 3/0433; G06F 3/0436; G06F 7/38; G06F 7/388

USPC ........................................... 178/18.01, 18.04
See application file for complete search history.

(56) References Cited

U.S. PATENT DOCUMENTS

| 7,292,227 | B2 | 11/2007 | Fukumoto et al. | |
|---|---|---|---|---|
| 7,812,269 | B2 | 10/2010 | Knowles et al. | |
| 2007/0079206 | A1* | 4/2007 | Arora et al. | 714/745 |
| 2009/0222262 | A1* | 9/2009 | Kim et al. | 704/231 |
| 2009/0264786 | A1 | 10/2009 | Jacquin | |
| 2010/0225595 | A1 | 9/2010 | Hodges et al. | |
| 2010/0282524 | A1 | 11/2010 | Linotte et al. | |
| 2011/0080341 | A1 | 4/2011 | Helmes et al. | |
| 2011/0237220 | A1* | 9/2011 | Matsuoka | 455/411 |
| 2012/0089363 | A1* | 4/2012 | Jang et al. | 702/150 |
| 2012/0296777 | A1* | 11/2012 | Fugman et al. | 705/27.1 |

OTHER PUBLICATIONS

Taiwan Patent Office, Office Action, Patent Application Serial No. 101119267, Jun. 5, 2014, Taiwan.

* cited by examiner

*Primary Examiner* — Gerald Johnson
*Assistant Examiner* — Christopher Kohlman

(57) ABSTRACT

An electronic device is provided, including a housing, at least one tap sensing unit and a processing unit. The housing has a touch surface, in which, when the touch surface is tapped more than one time in a predetermined interval, shock waves are generated. The tap sensing unit receives the shock waves to generate a moire signal. The processing unit obtains a shock wave source number of each of the shock waves according to the moire signal, and generates a string code according to a generation order of the shock waves and the shock wave source number of each of the shock waves, such that the processing unit controls the electronic device according to a control command corresponding to the string code.

13 Claims, 5 Drawing Sheets

ELECTRONIC DEVICES AND COMMAND INPUT METHODS THEREOF

CROSS REFERENCE TO RELATED APPLICATIONS

This Application claims priority of Taiwan Patent Application No. 101119267, filed on May 30, 2012, the entirety of which is incorporated by reference herein.

BACKGROUND OF THE INVENTION

1. Field of the Invention

The present disclosure relates to electronic devices, and in particular relates to electronic devices receiving input commands.

2. Description of the Related Art

Electronic devices, such as computer systems, computer peripherals, personal data assistants, cellular phones, personal audio/video devices (e.g., MP3 players), digital cameras, audio/video equipment (e.g., televisions, stereos, DVD players and recorders, etc.), security devices, and the like, require user interfaces for inputting data and/or commands.

However, the present procedures for inputting commands to the electronic devices are not practical and may cause the electronic device to malfunction. Therefore, there is a need for an electronic device and a command input method to overcome the problem described above.

BRIEF SUMMARY OF THE INVENTION

In light of the previously described problem, the disclosure provides an embodiment of an electronic device, including a housing, at least one tap sensing unit and a processing unit. The housing has a touch surface, in which, when the touch surface is tapped more than one time in a predetermined interval, shock waves are generated. The tap sensing unit receives the shock waves to generate a moire signal. The processing unit obtains a shock wave source number of each of the shock waves according to the moire signal, and generates a string code according to a generation order of the shock waves and the shock wave source number of each of the shock waves, such that the processing unit controls the electronic device according to a control command corresponding to the string code.

The disclosure also provides a command input method applied for an electronic device having a touch surface. The command input method comprises the steps of: generating a moire signal according to shock waves by a tap sensing unit of the electronic device, wherein, when the touch surface is tapped more than one time in a predetermined interval, shock waves are generated; obtaining a shock wave source number of each of the shock waves according to the moire signal; generating a string code according to a generation order of the shock waves and the shock wave source number of each of the shock waves; and controlling the electronic device according a control command corresponding to the string code.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE INVENTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
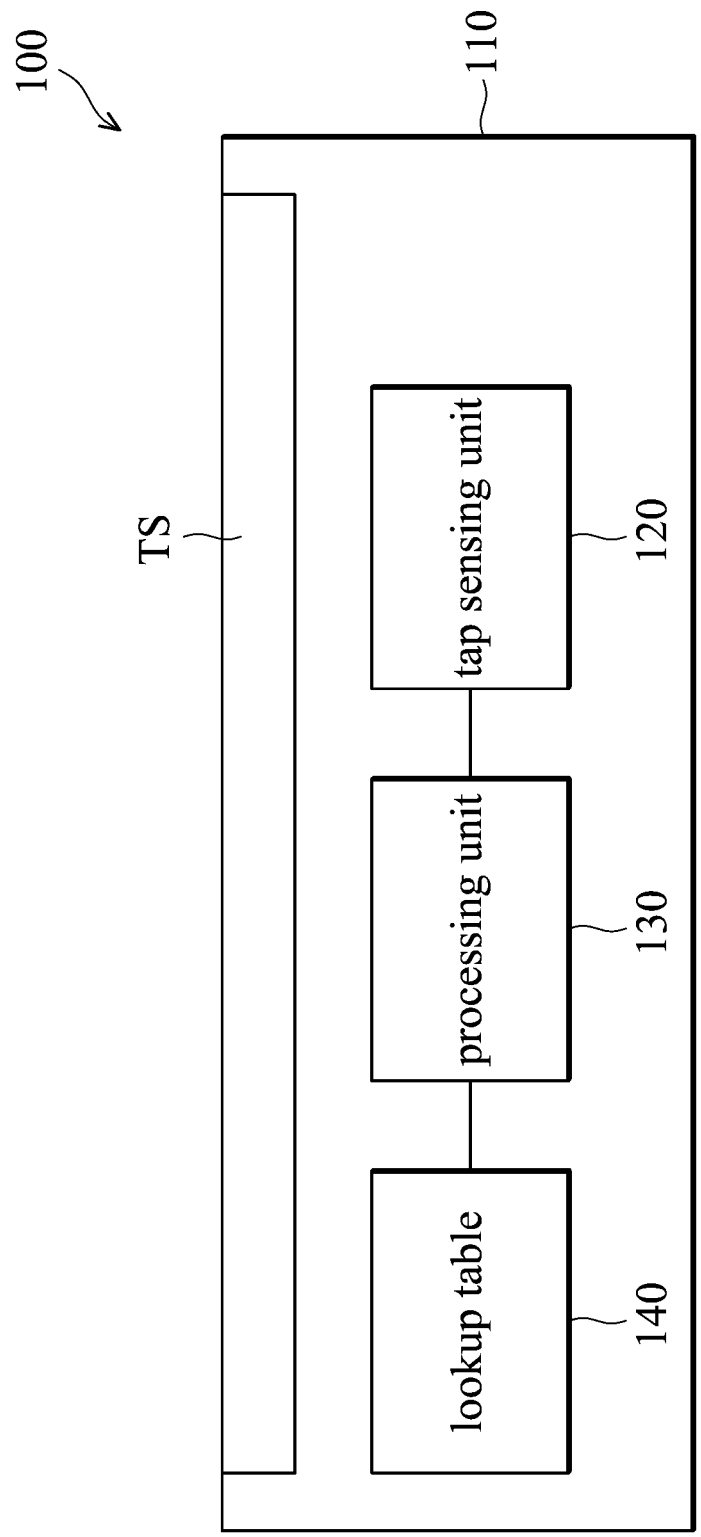
FIG. 1 illustrates a schematic view of the electronic device of the disclosure.

FIG. 1 illustrates a schematic view of the electronic device of the disclosure. As shown in FIG. 1, the electronic device 100 includes a housing 110, at least one tap sensing unit 120, a processing unit 130 and a lookup table 140. In detail, the housing 110 has a touch surface TS, in which the touch surface TS generates shock waves based on taps on the touch surface TS in a predetermined interval IT. Note that a shock wave can be generated by a plurality of the shock wave sources or can be generated by one shock wave source. For example, when a shock wave is generated by three fingers of the user tapping on the touch surface TS, the shock wave is the combination of waveforms of the three shock wave sources. When a shock wave is generated by one finger of the user tapping on the touch surface TS, the shock wave is formed by one waveform of the one shock wave source.

The tap sensing unit 120 can be a microphone, and be disposed in the housing 110 of the electronic device 100. The tap sensing unit 120 is configured to receive the shock waves and to generate a moire signal MS which is sent to the processing unit 130. The processing unit 130 obtains a shock wave source number of each of the shock waves according to the moire signal MS, and generates a string code according to a generation order of the shock waves and the shock wave source number of each of the shock waves. For example, the user sequentially uses three fingers (generation of the first shock wave), two fingers (generation of the second shock wave) and one finger (generation of the third shock wave) to tap the touch surface TS. The processing unit 130 obtains the shock wave number (e.g., 3) of the first shock wave, the shock wave number (e.g., 2) of the second shock wave and the shock wave number (e.g., 1) of the third shock wave according to the moire signal MS. The processing unit 130 generates the string code (e.g., 3-2-1) according to the generation order of the first, second and third shock waves and the shock wave source number of each of the first, second and third shock waves.

The processing unit 130 controls the electronic device 100 according to a control command corresponding to the string code. For example, when the string code is 3-2-3, the electronic device 100 answers the incoming call. When the string code is 2-2-2, the display unit (not shown) of the electronic device 100 shows a clock, weather or temperature. When the string code is 1-2-3, the electronic device 100 plays music or stops playing the music. The lookup table 140 stores a plurality of control commands each corresponding to one of the string codes. The lookup table 140 outputs the corresponding control command to the processing unit 130 according to the string code provided by the processing unit 130.

The lookup table 140 is disposed in a stage device. The stage device can be an electrically-erasable programmable read-only memory (EEPROM) or a read-only memory (ROM). When the control commands in the lookup table 140 can be set by the user, the lookup table 140 is disposed in the EEPROM. When the control commands in the lookup table 140 can not be set by the user, the lookup table 140 is disposed in the ROM. In some conditions, the lookup table 140 ignores the string code or the lookup table 140 outputs a ignoring signal to the processing unit 130 when the lookup table 140 has no control commands corresponding to the string codes outputted by the processing unit 130, so that the processing unit 130 disregards the moire signal MS outputted by the tap sensing unit 120.

In the embodiment, the electronic device 100 may be other computer system configurations, including handheld devices, portable devices, personal digital assistant, multiprocessor-based, microprocessor-based or programmable consumer electronics, network PCs, minicomputers, mainframe computers, and the like, but is not limited thereto. The processing units 130 can include a single central processing unit (CPU), a micro processing unit (MPU) or multiple processing units, commonly referred to as a parallel processing environment to analyze the shock wave numbers of the shock waves.

Figure 2:
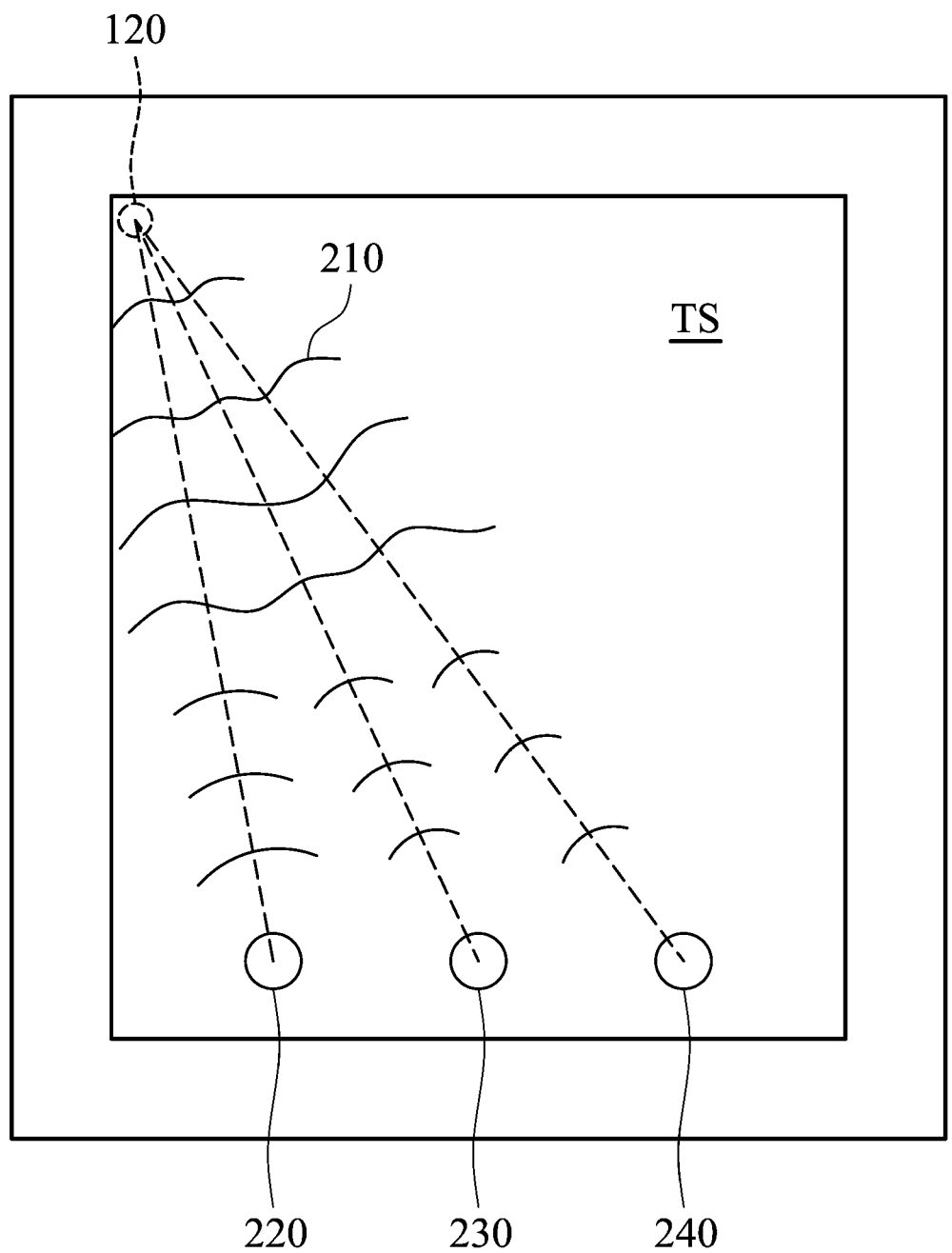
FIG. 2 illustrates a schematic view of the electronic device of the disclosure.

FIG. 2 illustrates a schematic view of the electronic device of the disclosure. As shown in FIG. 2, the shock wave 210 delivered to the tap sensing unit 120 is generated by the shock wave sources 220, 230 and 240. Therefore, by the shock wave source 210 analyzing the shock wave 210, the processing unit 130 can obtain how many shock wave sources generated the shock wave 210.

In the embodiment, the processing unit 130 uses independent subspace analysis (ISA) to calculate the shock wave number of each of the shock waves. In addition, the processing unit 130 of the disclosure also uses other analysis methods to calculate the shock wave number of each of the shock waves. For example, the tap sensing unit 120 sequentially receives the first, second and third shock waves and outputs the moire signal MS to the processing unit 130. The moire signal MS has a first area corresponding to the first shock wave, a second area corresponding to the second shock wave and a third area corresponding to the third shock wave. The processing unit 130 windows the first area of the moire signal MS to generate N shock wave sections. The processing unit 130 transforms each of the N shock wave sections into frequency domain by Fourier transform. The processing unit 130 performs independent component analysis (ICA) for the N transformed shock wave sections to generate N×M signal sources.

Next, the processing unit 130 separates the N×M signal sources into Z groups based on Kullback-Leibler divergence (KL divergence). When a divergence between two of the N×M signal sources is smaller than a predetermined threshold value, the processing unit 130 groups the two signal sources into the same group, such that the processing unit 130 separates the N×M signal sources into Z groups. Therefore, the number "Z" represents the shock wave number of the first shock wave. Generations of the shock wave numbers of the second and third shock wave are similar to the generation of the shock wave number of the first shock wave, and thus, are omitted for brevity.

Figure 3:
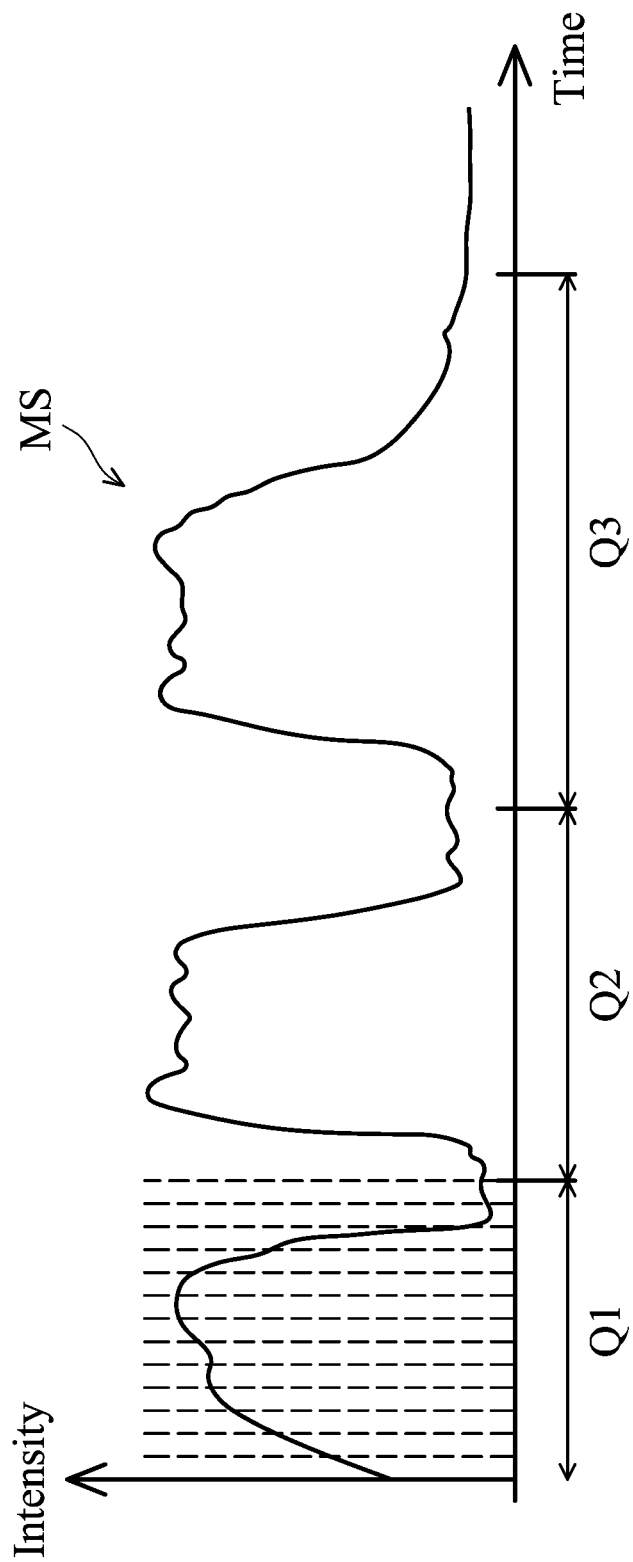
FIG. 3 illustrates a waveform of the moire signal of the disclosure.

FIG. 3 illustrates a waveform of the moire signal of the disclosure. As shown in FIG. 3, the touch surface TS is tapped three times in the predetermined interval IT. The user firstly uses three fingers to tap the touch surface TS. The user secondly uses two fingers to tap the touch surface TS. The user thirdly uses one finger to tap the touch surface TS. The moire signal MS has an area, Q1 corresponding to the first shock wave, an area Q2, corresponding to the second shock wave and an area Q3, corresponding to the third shock wave. How many times the touch surface TS is tapped is an example for illustration, but is not limited thereto.

In detail, the processing unit 130 windows the first area Q1 corresponding to the first shock wave in the moire signal MS to generate 10 shock wave sections (i.e., N=10). The processing unit 130 transforms each of the shock wave sections into frequency domain by Fourier transform. The processing unit 130 performs independent component analysis (ICA) for the N transformed shock wave sections. Assume that the maximum number of shock wave sources equals to 3 in the embodiment, the processing unit 130 can input 3 into M to generate 30 signal sources (i.e., N×M=30).

Next, the 30 signal sources are separated into Z groups based on Kullback-Leibler divergence (KL divergence). When a divergence between two of the 30 signal sources is smaller than the predetermined threshold value, the processing unit 130 groups the two signal sources into the same group. When the processing unit 130 generates 3 groups by the separation of the 30 signal sources, it represents that the shock wave number of the first shock wave is 3. Similarly, the processing unit 130 can generate 2 groups by the separation of the 30 signal sources corresponding to the second area Q2, and the processing unit 130 can generate one group by the separation of the 30 signal sources corresponding to the second area Q1. Therefore, the processing unit 130 generates the string code (i.e., 3-2-1) according to the generation order of the first, second and third shock waves and the shock wave source number of each of the first, second and third shock waves.

Figure 4:
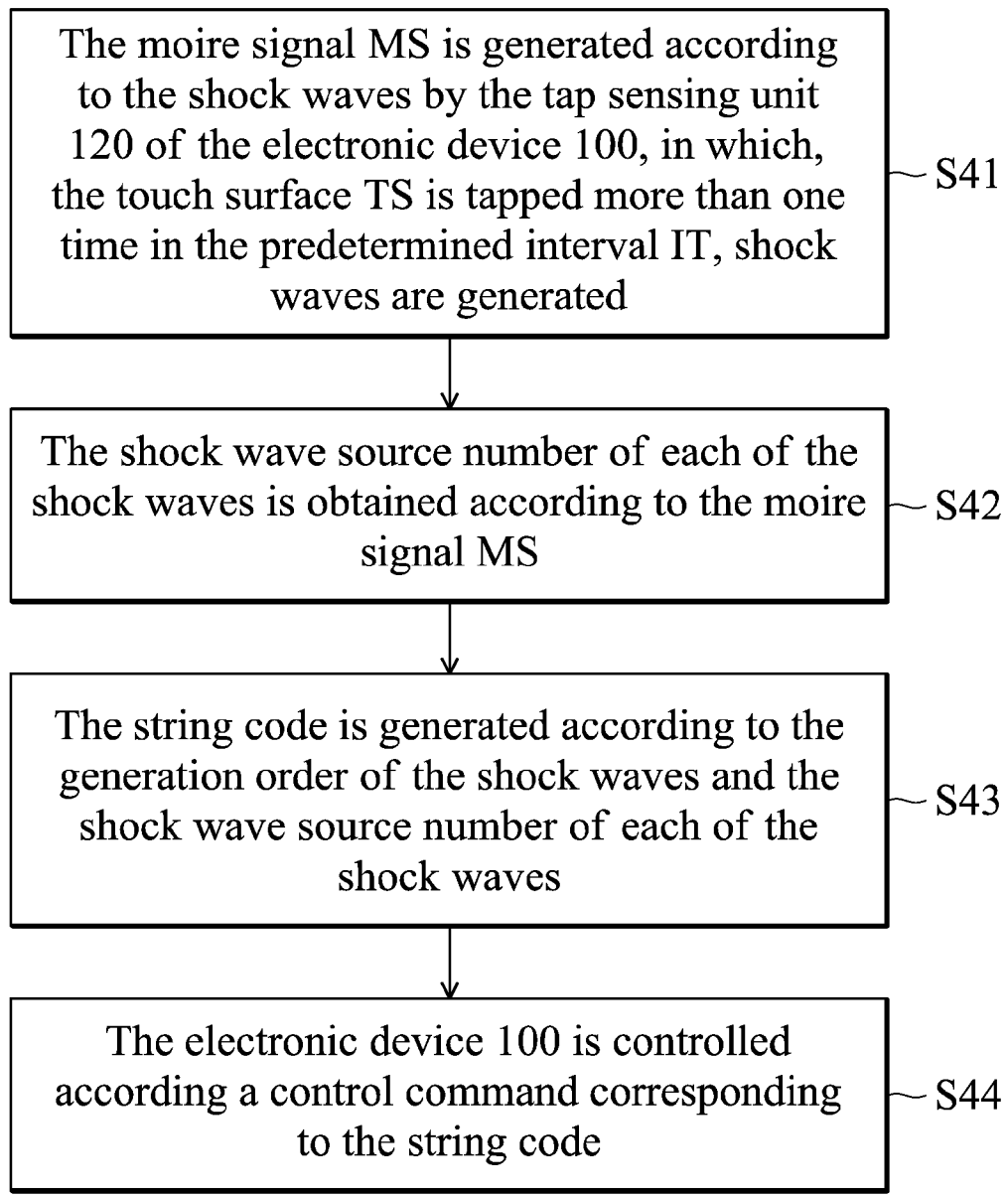
FIG. 4 illustrates a flowchart of the command input method of the disclosure.

FIG. 4 illustrates a flowchart of the command input method of the disclosure. As shown in FIG. 4, the command input method includes the following steps.

In step S41, the moire signal MS is generated according to the shock waves by the tap sensing unit 120 of the electronic device 100, in which, when the touch surface TS is tapped more than one time in the predetermined interval IT, shock waves are generated. In step S42, the shock wave source number of each of the shock waves is obtained according to the moire signal MS. In step S43, the string code is generated according to the generation order of the shock waves and the shock wave source number of each of the shock waves. In step S44, the electronic device 100 is controlled according a control command corresponding to the string code.

Figure 5:
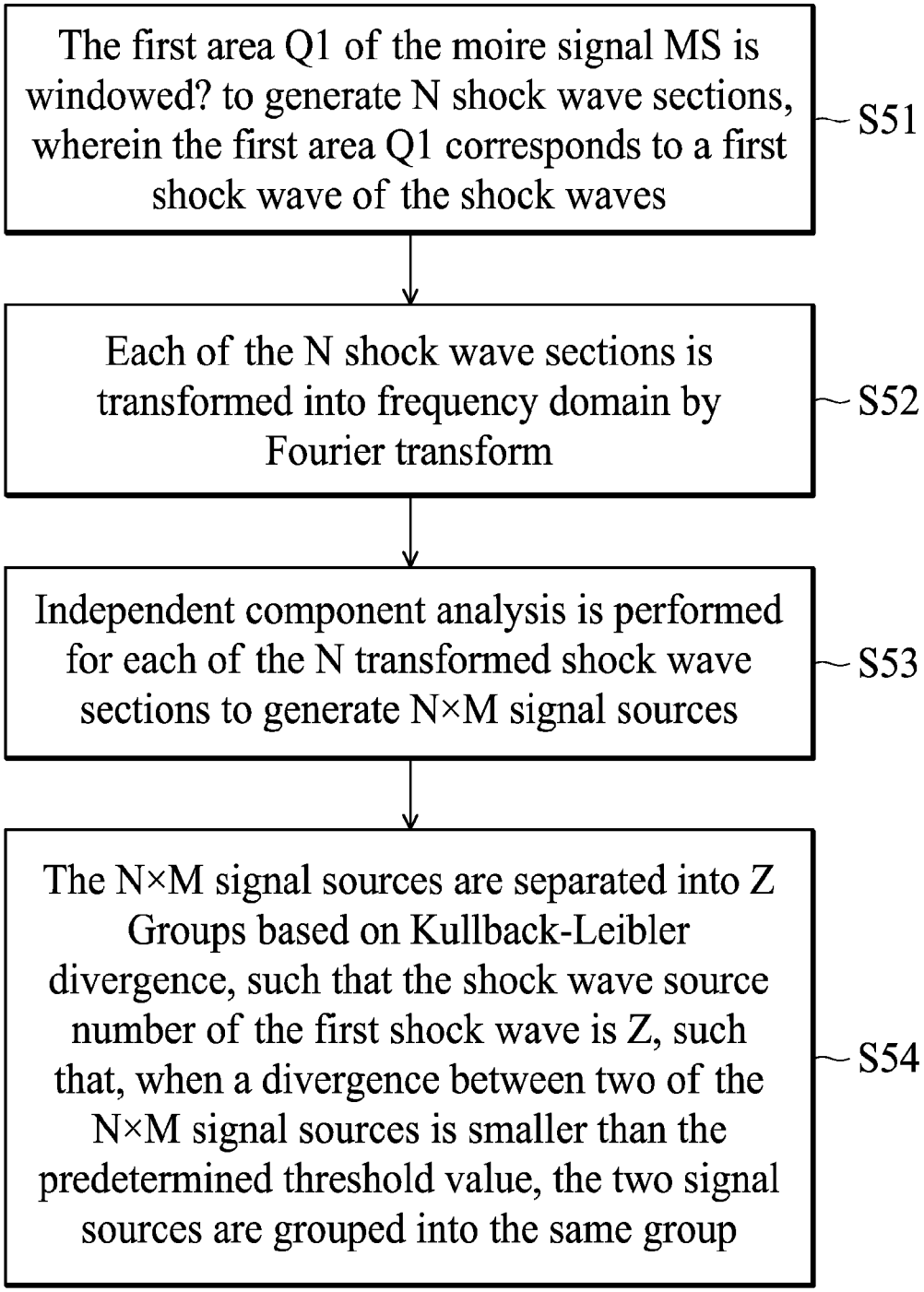
FIG. 5 illustrates a flowchart of the command input method of the disclosure.

FIG. 5 illustrates a flowchart of the step of obtaining the shock wave source number of the disclosure. As shown in FIG. 5, the step of obtaining the shock wave source number includes the following steps.

In step S51, the first area Q1 of the moire signal MS is windowed to generate N shock wave sections, wherein the first area Q1 corresponds to a first shock wave of the shock waves. In step S52, each of the N shock wave sections is transformed into frequency domain by Fourier transform. In step S53, independent component analysis is performed for each of the N transformed shock wave sections to generate N×M signal sources. In step S54, the N×M signal sources are separated into Z groups based on Kullback-Leibler divergence, such that the shock wave source number of the first shock wave is Z. In detail, when a divergence between two of the N×M signal sources is smaller than the predetermined threshold value, the two signal sources are grouped into the same group.

Since the generations of the string codes based on the shock wave number and the tap order are used in the disclosure, and the string code is served as a command to control the electronic device 100, malfunctions of the electronic device 100 are reduced. Furthermore, the combinations of the shock wave source numbers and the tap orders are more various, thus, the types of commands are increased to be more convenient and useful.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An electronic device, comprising:
    a housing, having a touch surface, wherein, when the touch surface is tapped more than one time in a predetermined interval, shock waves are generated;
    at least one tap sensing unit, receiving the shock waves to generate a moire signal; and
    a processing unit, obtaining a shock wave source number of each of the shock waves according to the moire signal, and generating a string code according to a generation order of the shock waves and the shock wave source number of each of the shock waves, such that the processing unit controls the electronic device according to a control command corresponding to the string code.

2. The electronic device as claimed in claim 1, wherein the processing unit windows a first area of the moire signal to generate N shock wave sections, wherein the first area corresponds to a first shock wave of the shock waves, wherein N is a positive integer.

3. The electronic device as claimed in claim 2, wherein the processing unit transforms each of the N shock wave sections into frequency domain by Fourier transform.

4. The electronic device as claimed in claim 3, wherein the processing unit performs independent component analysis for each of the N transformed shock wave sections to generate N×M signal sources, wherein M is a positive integer.

5. The electronic device as claimed in claim 4, wherein the processing unit separates the signal sources into Z groups based on Kullback-Leibler divergence, such that Z is the shock wave source number of the first shock wave, wherein, when a divergence between two of the signal sources is smaller than a predetermined threshold value, the processing unit groups the two signal sources into the same group.

6. The electronic device as claimed in claim 1, further comprising:
    a lookup table, outputting the corresponding control command to the processing unit according to the string code.

7. The electronic device as claimed in claim 1, wherein the tap sensing unit is a microphone, and the microphone is disposed in the housing.

8. A command input method, applied for an electronic device having a touch surface, comprising:
    generating a moire signal according to shock waves by a tap sensing unit of the electronic device, wherein, when the touch surface is tapped more than one time in a predetermined interval, shock waves are generated;
    obtaining a shock wave source number of each of the shock waves according to the moire signal;
    generating a string code according to a generation order of the shock waves and the shock wave source number of each of the shock waves; and
    controlling the electronic device according a control command corresponding to the string code.

9. The command input method as claimed in claim 8, wherein the step of obtaining the shock wave source number comprises:
    windowing a first area of the moire signal to generate N shock wave sections, wherein the first area corresponds to a first shock wave of the shock waves, wherein N is a positive integer.

10. The command input method as claimed in claim 9, wherein the step of obtaining the shock wave source number comprises:
    transforming each of the N shock wave sections into frequency domain by Fourier transform.

11. The command input method as claimed in claim 10, wherein the step of obtaining the shock wave source number comprises:
    performing independent component analysis for each of the N transformed shock wave sections to generate N×M signal sources, wherein M is a positive integer.

12. The command input method as claimed in claim 11, wherein the step of obtaining the shock wave source number comprises:
    separating the signal sources into Z groups based on Kullback-Leibler divergence, such that Z is the shock wave source number of the first shock wave, wherein, when a divergence between two of the signal sources is smaller than a predetermined threshold value, the two signal sources are grouped into the same group.

13. The command input method as claimed in claim 8, wherein the tap sensing unit is a microphone, and the microphone is disposed in a housing of the electronic device.

* * * * *